Sept. 18, 1928.
C. B. BAILEY
GASKET
Filed June 15, 1925
1,684,656
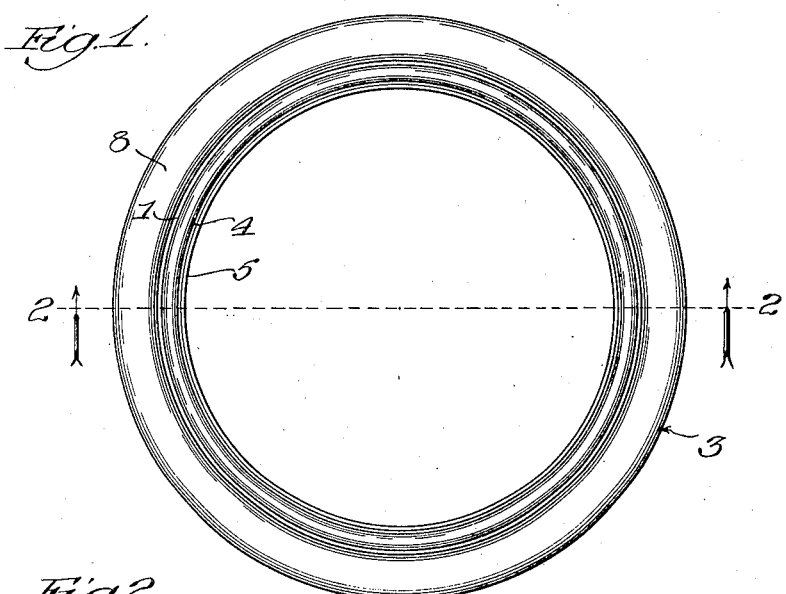
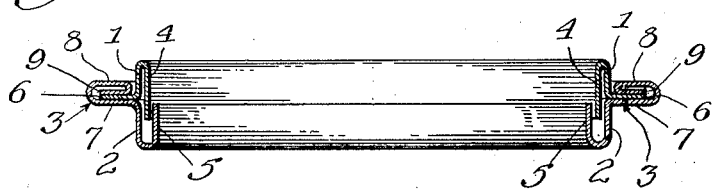
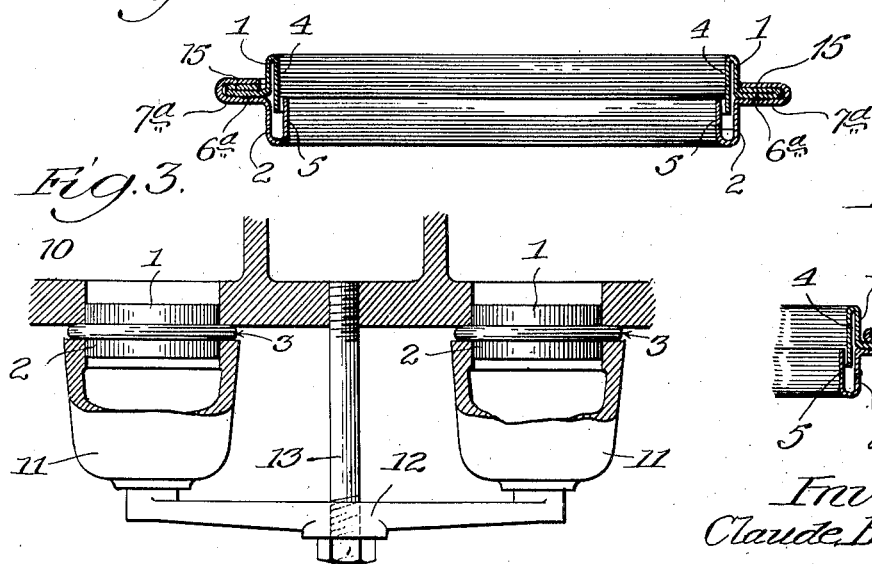
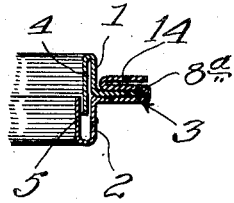
Inventor:
Claude B. Bailey, Patented Sept. 18, 1928.

1,684,656

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 15, 1925. Serial No. 37,039.

The Holle Patent No. 1,387,648, granted August 16, 1921, and my prior Patent No. 1,524,682, granted February 3, 1925, both show gaskets of the so-called "2 in 1" type. Such gaskets are used between a cylinder block and manifold pipe of an automobile engine assembly, and combine in one the tubular guides and the pressure receiving and joint sealing section of the gasket.

The principal object of my invention is to make gaskets of this general type entirely of sheet metal so as to avoid the use of asbestos or other packing as heretofore in said patents, thereby reducing the manufacturing cost of the gaskets.

The invention consists further in the matters hereinafter described and claimed.

In the accompanying drawings—

Fig. 1 is an elevational view of a gasket made in accordance with my invention;

Fig. 2 is a diametrical sectional view taken on line 2—2 of Fig. 1;

Fig. 3 shows the gasket in place between a cylinder block and manifold pipe; and Figs. 4 and 5 are sectional views showing modified forms of structure.

The gasket of my invention is made entirely of sheet metal, such as copper, brass, aluminum, zinc, or the like, and is formed to have tubular guides 1 and 2 on opposite sides of an outwardly extending annular section 3, which constitutes the pressure receiving and joint sealing portion of the gasket, as shown in Fig. 3.

The guides 1 and 2 carry flanges 4, 5 on the inside thereof, there being one of these flanges for each guide, as shown in Fig. 2. These flanges 4, 5 extend toward each other within the opening defined by the guides and overlap at their meeting ends for holding the guides against lateral bending. As shown in Fig. 2, these flanges overlap with the flange 5 on the outside.

Said flanges 4, 5 are connected with their respective guides 1, 2 at the outer edges of the latter, the connection being an integral one when the gasket is made in the form shown in Figs. 1 and 2. This is brought about by folding or turning the flanges 4, 5 inside of the guides from the sheet metal stock from which the parts are made, the respective guides and flanges being separately formed, as shown. In thus folding the metal, the folded edges provide smooth outer edges for the guides and prevent the flanges from being separated from their respective guides by handling the gasket or when applying it to the place of use.

The guides 1, 2 have overlapped base flanges 6, 7 turned outward at substantially right-angles thereto and having flat-wise contact. These flanges make up the main portion of the annular section 3. The base flange 7 is made wider than the base flange 6 and has its outer marginal portion 8 bent over on the flange 6 about the outer edge thereof for clamping the two together.

The portion 8 is doubled or folded on itself to provide a sufficient thickness of sheet metal in the section 3 to make the required pressure receiving portion or cushion for the gasket without the use of an asbestos ring or packing as heretofore employed in gaskets of this general character. This lessens the manufacturing cost of the gasket by eliminating the asbestos material and its insertion in a channel made by the annular section as heretofore. As shown in Fig. 2, the fold 9 of the marginal portion 8 is turned inward against the adjacent outer surface of the flange 6 and under the flange 8 to stiffen said flange 8 and prevent it from loosening up from the flange 6 to make a faulty gasket.

The gasket is particularly designed for use between a cylinder block 10 and a manifold pipe 11 of a motor vehicle engine assembly, as shown in Fig. 3. The annular section 3 is clamped between the members 10 and 11 by the manifold clamp 12 on the stud 13, as usual in assemblies of this kind. The guides 1, 2 extend into the registering port holes in the block and manifold pipe, respectively, and guide these parts in register in the application of one to the other, and combine in one the separate ring and gasket as heretofore supplied with such installations.

In Fig. 4, I have shown the same gasket structure as shown in the preceding figures, except that the marginal portion 14 of the flange 8ᵃ is turned outward on said flange instead of beneath or under the same. In both cases, Figs. 2 and 4, the folded metal extends to the associated guide 1 and overlies substantially if not all of the base flange 6.

In Fig. 5, I have shown a slightly different manner of flange folding to provide the multiple thickness of sheet metal for the pressure receiving section of the gasket. In Fig. 5, base flange 6ª is made wider than the corresponding flange of the gasket in the preceding figures, and is folded over on itself at its outer margin to provide the overlapping portion 15. The flange 7ª, as before, is made wider than 6ª and has its outer marginal portion folded over on the folded flange 15 to clamp the parts of the gasket together and to also provide the thickness required for the cushion. In other respects the gasket is the same as in Figs. 1 to 4, and like parts are numbered the same in all of the figures.

I claim as my invention:

1. A gasket made entirely of sheet metal and consisting of two separate annular sheet metal sections, each section having a tubular guide portion and an outwardly projecting lateral flange at the base of the guide portion, said sections being arranged one above the other with their base flanges in overlapping contact and with their guide portions projecting outwardly on opposite sides of the same, one of said base flanges being formed wider than the other and having its outer marginal portions bent over the outer edge of the other base flange and in contact therewith and extending across the same for holding the two sections of the gasket assembled by clamping their base flanges together, said base flanges and the folded marginal portion of one of the same forming the pressure receiving section of the gasket entirely of sheet metal and surrounding the tubular guides on one side of said base flanges.

2. A gasket made entirely of sheet metal and composed of two separate annular sheet metal sections, each section having a tubular guide portion and an outwardly projecting lateral flange at the base of the guide portion, said sections being arranged one above the other with their base flanges in overlapping contact and with their tubular guides on opposite sides of the same and in substantial alignment, one of said base flanges being formed wider than the other and having its outer marginal portion bent over the outer edge of the other base flange and extending substantially across the same, said marginal portion being again folded inward on itself to engage said other base flange and clamp the base flanges together for holding the two sections of the gasket assembled, said base flanges and the folded marginal portion of one of the same forming the pressure receiving portion of the gasket entirely of sheet metal and of a multiplicity of layers on the outside of the tubular guides of the gasket.

3. A gasket made entirely of sheet metal and composed of two separate annular sheet metal sections, each section having a tubular guide portion and an outwardly projecting lateral flange at the base of the guide portion, said sections being arranged one above the other with their base flanges in overlapping contact and with their guides on opposite sides of the same and extending outward therefrom in substantial alignment, one of said base flanges being made wider than the other and having its outer marginal portion bent over the outer edge of said other base flange and extending across the same and in contact therewith for holding the two sections of the gasket assembled by clamping the base flanges together, said base flanges and the folded marginal portion of one of the same forming the pressure receiving portion of the gasket entirely of sheet metal about the tubular guides of the gasket, and annular means inside of said guide portions and connected therewith along their respective outer edges for holding said guides against bending.

4. A gasket made entirely of sheet metal and composed of two separate sheet metal annular sections, each section having a tubular guide portion and an outwardly projecting lateral flange at the base of the guide portion, said sections being arranged one above the other with their base flanges in overlapping contact and with their guide portions extending outward therefrom on opposite sides of the same, one of said base flanges being formed wider than the other and having its outer marginal portion bent over the outer edge of the other base flange and in contact therewith and extending across the same for holding the gasket sections assembled by clamping their base flanges together, said base flanges and the folded portion of one of the same forming the pressure receiving section of the gasket about the guide portions, and strengthening flanges inside of said guide portions and connected therewith, said strengthening flanges extending toward each other from the respective outer edges of the guides and overlapping at their meeting ends inside of the guides for holding the guides against bending.

In testimony whereof, I affix my signature this 10 day of June, 1925.

CLAUDE B. BAILEY.